(12) United States Patent
Liu et al.

(10) Patent No.: US 9,288,765 B2
(45) Date of Patent: Mar. 15, 2016

(54) SCALING TRANSMIT POWER IN MULTI-ANTENNA WIRELESS SYSTEMS

(75) Inventors: Jing Xiu Liu, Beijing (CN); Jian Feng Kang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 82 days.

(21) Appl. No.: 13/983,584

(22) PCT Filed: Feb. 7, 2011

(86) PCT No.: PCT/CN2011/000197
§ 371 (c)(1),
(2), (4) Date: Aug. 30, 2013

(87) PCT Pub. No.: WO2012/106832
PCT Pub. Date: Aug. 16, 2012

(65) Prior Publication Data
US 2013/0337862 A1    Dec. 19, 2013

(51) Int. Cl.
*H04W 52/00* (2009.01)
*H04W 52/04* (2009.01)
*H04W 52/02* (2009.01)
*H04B 7/06* (2006.01)
(Continued)

(52) U.S. Cl.
CPC ............. *H04W 52/04* (2013.01); *H04B 7/0617* (2013.01); *H04B 17/12* (2015.01); *H04W 52/0206* (2013.01); *H04W 52/42* (2013.01); *H04B 7/0417* (2013.01); *Y02B 60/50* (2013.01)

(58) Field of Classification Search
CPC .............................. H04W 52/00; H04B 7/0456
USPC ............ 455/522, 572, 67.11, 69, 3.03, 452.1, 455/509, 502, 3.01, 66.1; 370/208, 210; 375/295, 260, 211
See application file for complete search history.

(56) References Cited

U.S. PATENT DOCUMENTS

2005/0018597 A1   1/2005  Yuda et al.
2009/0238304 A1*  9/2009  Vetter et al. ................... 375/295
(Continued)

FOREIGN PATENT DOCUMENTS

CN    101459958 A    6/2009
CN    101674642 A    3/2010
(Continued)

OTHER PUBLICATIONS

Jingon Joung, et al.; "Beamforming and PAPR Reduction for MISO-OFDM Systems"; 2007 IEEE; pp. 377-380.
Yanfei Liu, et al.; "Joint Optimization for PAPR reductions and opportunistic beamforming (OBF) in OFDM systems"; 2009 IEEE; 4 pages.
(Continued)

*Primary Examiner* — John J Lee
(74) *Attorney, Agent, or Firm* — Harrington & Smith (57) ABSTRACT

There is provided a network component of a wireless communication network. The network component includes at least two output ports, each output port being associated with an antenna. The network component further includes a controller for providing a power signal set having at least two power signal components, each power signal component being associated with one of at least two output ports and being indicative of a power portion to be provided to its associated antenna for generating a transmission to a receiving network component of the wireless communication network. Further, the network component includes a power adjustment unit for scaling power signal components of the power signal set, thereby providing a scaled power signal set.

22 Claims, 5 Drawing Sheets

(51) Int. Cl.
*H04W 52/42* (2009.01)
*H04B 17/12* (2015.01)
*H04B 7/04* (2006.01)

(56) References Cited

U.S. PATENT DOCUMENTS

| | | | |
|---|---|---|---|
| 2010/0211359 A1 | 8/2010 | Mehta | 702/188 |
| 2010/0284445 A1* | 11/2010 | Barriac et al. | 375/211 |
| 2011/0086679 A1* | 4/2011 | Li et al. | 455/572 |

FOREIGN PATENT DOCUMENTS

| | | |
|---|---|---|
| EP | 2 073 592 A2 | 6/2009 |
| WO | 95/34103 A1 | 12/1995 |

OTHER PUBLICATIONS

Timothy A. Thomas, et al.; "PAPR reduction for beamforminig OFDM transmitters"; 2006 IEEE; pp. 289-292.

3GPP TSG RAN WG1 meeting #60bis, Beijing, China, Apr. 2-16, 2010, R1-102011, "Power scaling method for UL PC with Carrier aggregation", CATR, 7 pgs.

* cited by examiner

| QCI | Resource Type | Priority (CR S2-080787) | Packet Delay Budget | Packet Loss Rate | Example Service |
|---|---|---|---|---|---|
| 1 | GBR | 2 | 100 ms | $10^{-2}$ | Conversational Voice |
| 2 | GBR | 4 | 150 ms | $10^{-3}$ | Conversational Video (Live Streaming) |
| 3 | GBR | 5 | 300 ms | $10^{-6}$ | Non-Conversational Video (Buffered Streaming) |
| 4 | GBR | 3 | 50 ms | $10^{-3}$ | Real Time Gaming |
| 5 | Non-GBR | 1 | 100 ms | $10^{-6}$ | IMS Signaling |
| 6 | Non-GBR | 7 | 100 ms | $10^{-3}$ | Voice, Video (Live Streaming) Interactive Gaming |
| 7 | Non-GBR | 6 | 300 ms | $10^{-6}$ | Video (Buffered Streaming) TCP-based (e.g., www, email, chat, ftp,p2p file sharing, progressive video, etc.) |
| 8 | Non-GBR | 8 | 300 ms | $10^{-6}$ | |
| 9 | Non-GBR | 9 | 300 ms | $10^{-6}$ | |

SCALING TRANSMIT POWER IN MULTI-ANTENNA WIRELESS SYSTEMS

FIELD OF THE INVENTION

The present invention relates to the field of wireless communication networks and in particular to wireless communication networks which use several antenna elements for a transmission to a receiving network component.

BACKGROUND OF THE INVENTION

Modern wireless communication networks often use several antenna elements for a transmission to a receiving network component, e.g. a user equipment. A current example is LTE (3GPP Long-Term Evolution). In particular in time division duplexing (TDD) beam forming can provide for an increased performance. In beam forming, individual transmissions from at least two antenna elements are adjusted in phase and amplitude so as to provide an increased signal strength at the location of a target user equipment.

However, operating different antenna elements at different power levels bears the risk that a corresponding power amplifier of an antenna element reaches or exceeds its maximum transmission power, leading to clipping and signal distortion. In contrast, operating the power amplifier well below its available maximum transmission power reduces efficiency of the system. Further, different power levels may lead to a high peak-to-average power ratio which might also adversely affect the operation of the power amplifier.

In view of the above-described situation, there exists a need for an improved technique that enables to provide a wireless communication system substantially avoiding or at least reducing one or more of the above-identified problems.

SUMMARY OF THE INVENTION

This need may be met by the subject-matter according to the independent claims. Advantageous embodiments of the herein disclosed subject-matter are described by the dependent claims.

According to a first aspect of the herein disclosed subject matter, there is provided a network component of a wireless communication network, the network component comprising at least two output ports, each output port being associated with an antenna; a controller for providing a power signal set having at least two power signal components, each power signal component being associated with one of at least two output ports and being indicative of a power portion to be provided to its associated antenna for generating a transmission to a receiving network component of the wireless communication network; and a power adjustment unit for scaling power signal components of the power signal set, thereby providing a scaled power signal set.

This aspect of the invention is based on the idea that by appropriate scaling of some or all of the power signal components of the power signal set the characteristics of the wireless communication network including such a network component may be improved.

For example, in an embodiment, the network component is a base station of a wireless communication network or at least a part of a base station of a wireless communication network. According to a further embodiment, the wireless communication network is a cellular communication network. For example, in an embodiment where the network component is a base station of a wireless communication network, the network component and its associated antennas may belong to a single cell or, in another embodiment, belong to two or more cells. As specified above, each power signal component is indicative of a power portion which is to be provided to the associated antenna to thereby result in a transmission from the antenna to the receiving network component.

According to an embodiment, the receiving network entity is an user equipment, for example a mobile phone or a computer.

According to an embodiment, the controller is configured for providing the power signal components of the power signal set in a frequency domain. For example, in an embodiment, the power signal set is provided for a frequency sub-band associated with the receiving network component. For example, in a case where several receiving network components are in communication with the network component, a respective frequency sub-band may be associated with each of the receiving network components. Since we consider cases of a network component having at least two antennas associated therewith, there are at least two power signal components of the respective frequency sub-band, each power signal component being associated with the respective output port.

Having the power signal set being provided in the frequency domain, the scaling of power signal components is also done in the frequency domain. This has the advantage that if a frequency sub-band is associated with each receiving network component the scaling can be performed for each receiving network component individually. Due to the scaling per power signal set, distortions of the transmissions corresponding to the power signal set can be avoided.

In accordance with a further embodiment, the network component further comprises an inverse Fourier transformer for generating an amplifier driver signal in a time domain on the basis of the scaled power signal set in the frequency domain.

According to a further embodiment, each of the power signal components is a beam forming weighting factor. Beam forming weighting factors are provided so as to increase the signal strength at the location of a specific receiving network component. Scaling of these beam forming weighting factors can easily be performed, e.g. by multiplying the beam forming weighting factors with a scaling factor. In such a way, a set of scaled beam forming weighting factors (i.e. a scaled power signal set) is obtained. However, signal processing on the basis of the scaled beam forming weighting factors can be unchanged compared to a case without scaling of the beam forming weighting factors. Hence, in such an embodiment the teaching of aspects and embodiments as described herein can easily applied to existing configurations.

According to a further embodiment, the controller is configured for providing at least one further power signal set having at least two power signal components, wherein each power signal component of the further power signal set is associated with one of at least two output ports and is indicative of a power portion to be provided to the associated antenna for generating a respective transmission to a further receiving network component of the wireless communication network. Hence, in accordance with embodiments of the herein disclosed subject-matter, for each receiving network component a corresponding power signal set is provided, indicating the power portion provided to the antennas for generating a transmission to the respective receiving network component.

According to an embodiment, the power adjustment unit is configured for scaling the power signal set depending on the at least one further power signal set. According to a further embodiment, the power adjustment unit is configured for scaling the power signal set depending on the power signal set itself, i.e. depending on the power signal components of the power signal set. According to a further embodiment, the power adjustment unit is configured for scaling the power signal set depending on all power signal sets that are handled by the controller, i.e. depending on the power signal set and depending on the further power signal sets being related to the further receiving network components.

Generally speaking, in an embodiment the scaling performed by the power adjustment unit is performed on the basis of at least one power signal set associated with a respective one of at least one receiving network component. According to other embodiments, the scaling can be performed on the basis of at least one operating parameter of the network component and/or at least one operating parameter of at least one receiving network component. According to a further, mixed embodiment, the scaling is performed on the basis of at least one power signal set and at least one operating parameter.

According to a further embodiment, the network component comprises an amplifier assembly for generating at each of the at least two output ports an output power depending on the power signal component of the scaled power signal set; the power adjustment unit being configured for scaling the power signal set so as to maintain the output power at each of the at least two output ports below a threshold.

Furhter, the output power may be generated depending on at least one further power signal set or scaled power signal set. For example, in an embodiment, the amplifier assembly is configured for generating at each of the at least two output ports an output power depending on the power signal component of the scaled power signal set and the at least one (probably scaled, depending on the actual embodiment) further power signal set. According to a further embodiment, the power adjustment unit is configured for scaling the power signal set and the further power signal set so as to maintain the output power at each of the at least two output ports below a threshold.

Instead of an output power generated by an amplifier assembly, an amplifier drive signal may be provided at the output port of the network component, the amplifier drive signal being indicative of the output power to be generated by an amplifier assembly for each antenna associated with the amplifier assembly. Hence, depending on which embodiments are implemented in a network component, the output port provides a power output that may be configured for being directly fed to an antenna or, in other embodiments, an amplifier drive signal. Moreover, other output types may be provided at the output port. Further, in an embodiment the term "output port" relates to a physical terminal, e.g. a power terminal which is coupled or coupleable with an antenna. In another embodiment, the term "output port" relates to a logical terminal, e.g. a logical port. Such a logical terminal may be used e.g. in an embodiment where an amplifier drive signal is supplied to the output port.

According to an embodiment, the power adjustment unit is configured for scaling the power signal set corresponding to the receiving network component depending on the location of the receiving network component. For example, in an embodiment, the scaling is performed depending on whether the receiving network component is at an edge of a cell served by the network component or not. For example, if the receiving network component is located at an edge of a cell, the power level with which the receiving network component receives transmissions from the network component may be relatively low. In such a case, a downscaling of the transmission power to be provided to such a UE may adversely affect the communication between the network component and the receiving network component. Hence, in an embodiment, in such cases the scaling of the power signal set is performed so as to not reduce the power signal components in the power signal set below a certain threshold. It should be understood that generally herein, although clipping in the power amplifier should be avoided if possible, at least in some cases the scaling may be performed so as to increase the respective power signal components, thereby making it possible to increase the coverage of a cell provided by the network component. In such a way, communication to a receiving network component located at a cell edge may be improved.

Generally speaking, in an embodiment, the power adjustment unit is configured for scaling the power signal set so as to increase the signal strength at the location of the receiving network component. Hence, in an embodiment the coverage of a cell provided by the network component may be selectively extended for a particular receiving network component.

Having regard to the term "location of the receiving network component" it should be understood that this location corresponds to the location of the antennas of the receiving network component as the antennas are the actual receiving entities and hence the location of the antennas of the receiving network component determines the received signal strength.

According to a further embodiment, the power adjustment unit is configured for scaling the power signal set depending on a transmission type of the transmission to the receiving network component. For example, there may be a different quality of service (QoS) requirements for different transmission types. Performing the scaling of the power signal set depending on the transmission type, or, in another embodiment, according to a quality of service requirement, provides for the possibility of having reduced clipping while still maintaining a desired quality of service for a particular transmission. In another embodiment, the scaling may depend on the percentage of transmissions of a certain transmission type in relation to all transmissions. Such an embodiment allows to cope with situations where many or all of the transmission require a certain quality of service level but still have to be scaled down in the power of the respective power signal components in order to avoid clipping. However, it should be mentioned that generally herein clipping avoidance is of high priority only in some embodiments of the herein disclosed subject-matter. In other embodiments, other parameters are taken into account with a priority that is higher than the priority of clipping avoidance. For example, in other embodiments, appropriate scaling of power signal sets will be performed even if there is some clipping introduced or at least if the clipping is not completely avoided by such a scaling.

According to a further embodiment, each power signal component corresponds to a communication channel between the network component and the receiving network component, wherein the power adjustment unit is configured for scaling the power signal set depending on the channel state of the communication channels corresponding to the power signal components of the power signal set. For example, in a case where the same scaling factor is applied to each power signal component, the scaling factor may depend on whether the channel state of all communication channels corresponding to the power signal set are in a specific relation with regard to a threshold. For example, if the channel state of one or more of the communication channels corresponding to a power signal set is in a poor condition, e.g. is below a certain threshold, downscaling of the power signal components may not be performed in such a case. To this end and in accordance with an embodiment, the power adjustment unit may comprise an decision unit for receiving parameters, such as channel state information, location information or transmission type information, in order to provide respectively adapted scaling factor for each of the power signal components.

Further, it should be mentioned that in some embodiments, all power signal components of a power signal set are scaled by the same scaling factor, whereas in other embodiments, individual scaling factors may be provided for each of the power signal components of a power signal set. For example, in such an embodiment a scaling vector may be provided for each power signal set, wherein the scaling vector includes a respective scaling vector component (scaling factor) for each power signal component of the corresponding power signal set.

Taking into account embodiments of the herein disclosed subject matter, generally the power adjustment unit may be configured for taking into account at least two decision parameters with different priority. Generally herein a decision parameter is a parameter that affects a decision whether or not a power signal component is scaled and/or to what extend a power signal component is scaled.

According to a further embodiment, the power adjustment unit is configured for scaling the power signal set per transmission time interval (TTI), wherein the transmission time interval is the duration of an independently decodable transmission generated by the network component. According to other embodiments, the scaling of the power signal set is done for a different time interval or according to another quantity than time. For example, in an embodiment, the scaling may be performed per symbol.

According to a second aspect of the herein disclosed subject-matter, a method of operating a network component of a wireless communication network is provided, the method comprising: receiving, e.g. from a controller as described with regard to the first aspect, a power signal set having at least two power signal components wherein each power signal component is associated with one of at least two antennas and wherein each power signal component is further indicative of a power portion to be provided to its associated antenna for generating a transmission to a receiving network component of the wireless communication network; the method further comprising scaling the power signal components of the power signal set, thereby providing a scaled power signal set.

According to an embodiment, the scaling of the power signal components of the power signal set is performed in a frequency domain. This may allow for a scaling of the power signal components per receiving network component.

According to a further embodiment, the power signal set is associated with a frequency sub-band, wherein the network component is a base station of the wireless communication network, and wherein the frequency sub-band is associated with a user equipment communicating with the base station.

According to a further embodiment, the scaling of the power signal components of the power signal set is performed depending on an operating parameter of the network component and/or an operating parameter of the receiving network component.

According to a still further embodiment, each power signal component is a beam forming weighting factor determining the power level at the output port. In a further embodiment, the power signal component also determines the phase of the transmission generated in response to the output power provided at the output port.

Generally herein, the method and embodiments of the method according to the second aspect may include performing one or more functions described with regard to the first aspect or an embodiment thereof.

According to a third aspect of the herein disclosed subject-matter, a computer program for processing a physical object, namely a power signal set, is provided, the computer program being adapted for, when executed by a data processor assembly, controlling the method as set forth in the second aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a network component and a method of operating a network component. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

The illustration in the drawings is schematic. It is noted that in different figures, similar or identical elements are provided with the same reference signs or with reference signs, which are different from the corresponding reference signs only within the first digit.

In the following, embodiments of the herein disclosed subject matter are illustrated with reference to the drawings and reference to aspects of current standards, such as LTE. However, such reference to current standards is only exemplary and should not considered as limiting the scope of the claims.

LTE systems including both time division duplex (TDD) and frequency division duplex (FDD) are potential next generation wireless access networks. Different from LTE FDD, channel reciprocity is the key attractive feature in TDD-LTE system, and therefore beamforming based thereon can provide better performance than LTE FDD system. An orthogonal frequency division multiplexing (access) (OFDM(A)) scheme is employed as the downlink access scheme in LTE system. Then one issue of OFDM(A) system may arise if a peak-to-average power ratio (PAPR) occurs which means that the aggregated signal across all the subcarriers (subbands) in frequency domain will fluctuate in a large range. Such a high PAPR represents a challenge for the analog power amplifier of the system, thus either increasing the cost of power amplifier or degrade the system performance due to signal distortion.

An advantage of beamforming in a TDD-LTE over codebook-based precoding in a LTE FDD system is that both amplitude and phase can be designed or calculated based on instantaneous channel response so as to provide high beamforming gain. Different user equipments (UEs) are scheduled at different positions in frequency domain, and the beamforming weighting vectors for different UEs are independent since the channel response for different UEs are independent with each other. Thus, additional to the PAPR due to different modulation level across frequency domain, beamforming will further increase the PAPR. If no provisions for reducing high PAPR are provided, the power amplifier tends to clipping and introduces more signal distortion and corresponding worse performance. Using a power amplifier with larger linear range mitigates the problem but results in correspondingly higher manufacturing cost.

Figure 1:
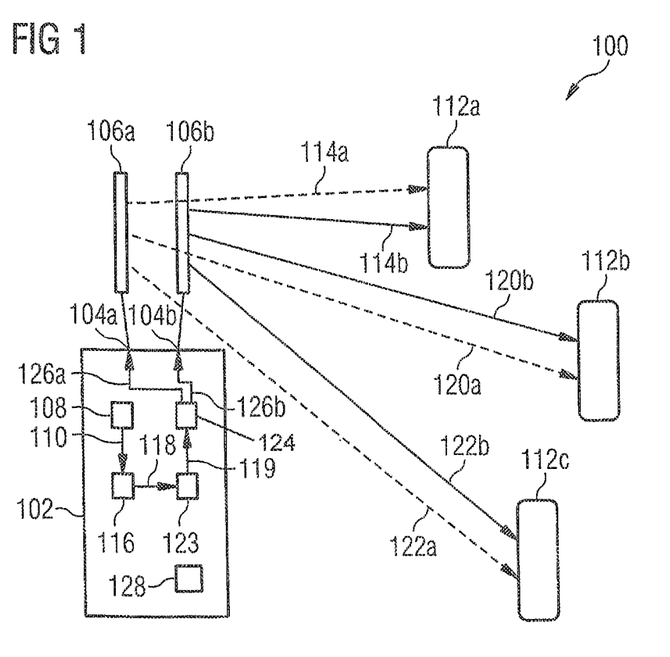
FIG. 1 shows a wireless communication network with a network component in accordance with embodiments of the herein disclosed subject matter.

FIG. 1 shows a wireless communication network 100 with a network component 102 in accordance with embodiments of the herein disclosed subject matter. The network component 102 comprises two output ports 104a, 104b, each of which is associated with an antenna 106a, 106b. According to an embodiment shown in FIG. 1, the antennas 106a, 106b are part of the network component 102. However, network component 102 may be sold independently from antennas 106a, 106b.

In accordance with an embodiment, the network component 102 is a base station of the communication network 100 and comprises a controller 108 for providing a power signal set 110 having at least two power signal components of which each power signal component is associated with one of the two output ports 104a, 104b. Each power signal component of the power signal set 110 is indicative of a power portion to be provided to its associated antenna 106a, 106b. For example and in accordance with an embodiment, the power signal set may be a beamforming vector having beamforming weighting factors as power signal components which define the power (e.g. amplitude and optionally phase of the power) to be transmitted to the respective antenna 106a, 106b corresponding to the respective beamforming weighting factor. The controller 108 is configured for providing the beamforming weighting factors so as to increase the signal strength at the location of a receiving network component. For example, when considering a first receiving network component 112a in the form of a user equipment, the beamforming vector represented by the power signal set 110 is configured by the controller 108 such that transmissions 114a, 114b which are generated on the basis of the beamforming vector 110, constructively interfere at the location of the first receiving network component 112a, thereby increasing the signals strength received by the first receiving network component 112a. Generating appropriate beamforming weighting factors by a controller 108 is known in the art and is therefore not further discussed herein.

In accordance with embodiments of the herein disclosed subject matter, the power signal set is not used directly to determine the power to be transmitted to the respective antenna 106a, 106b. Rather, a power adjustment unit 116 for scaling the power signal components of the power signal set 110 is provided. The power adjustment unit 116 provides a scaled power signal set 118 in response to receiving the power signal set 110.

In accordance with an embodiment, the controller is not only configured to generate a single power signal set but rather for generating a plurality of power signal sets, one for each receiving network component with which the network component 102 communicates. Exemplarily, three receiving network components are shown in FIG. 1, the first network component 112a and two further receiving network components 112b, 112c, which are also referred to as second receiving network component 112b and third receiving network component 112c, respectively. The receiving network components 112a, 112b, 112c shown in FIG. 1 are user equipments, in accordance with an embodiment.

Although not shown in FIG. 1 for clarity of the illustration, according to an embodiment the controller 108 provides a power signal set for each user equipment 112a, 112b, 112c. Each further power signal set is configured similar to the already described power signal set 110. Hence, the further power signal sets also have at least two beam forming weighting factors (two for two antennas 106a, 106b as shown in FIG. 1), wherein each beam forming weighting factor of the further power signal set is associated with one of the at least two output ports 104a, 104b. In accordance with embodiments of the herein disclosed subject matter, the beam forming weighting factors are indicative of a power portion to be provided to its respective associated antenna for generating a respective transmission to the further receiving network component of the wireless communication network. For example, as in the exemplary case shown in FIG. 1, transmissions 120a, 120b are generated on the basis of beam forming weighting factors configured so as to increase the signal strength at the location of the second user equipment 112b. Further, transmissions 122a, 122b are generated on the basis of beam forming weighting factors configured so as to increase the signal strength at the location of the third user equipment 112c.

In accordance with an embodiment, the power adjustment unit 116 is configured for scaling the power signal set 110 depending on the at least one further power signal set.

In accordance with an embodiment, the power signal set 110 and the corresponding scaled power signal set 118 are both provided in the frequency domain. In order to provide an amplifier driver signal 119 in the time domain, an inverse- Fourier transformer 123 for generating the amplifier driver signal 119 on the basis of the scaled power signal set(s) is provided.

In accordance with a further embodiment, the network component 102 further comprises an amplifier assembly 124 for generating at each of the at least two output ports 104a, 104b an output power 126a, 126b depending on the power signal component of the scaled power signal set 118. For example, in an embodiment, the amplifier assembly 124 receives the amplifier driver signal 119 from the inverse Fourier transformer 123 and generates, in response hereto, the output power 126a, 126b. Hence, in the embodiment shown in FIG. 1, it is the output power 126a, 126b for the antennas 106a, 106b that is fed to the output ports 104a, 104b. However, in an alternative embodiment, the power signal components of scaled power signal set, e.g. the scaled beam forming weighting factors 118 or the amplifier driver signal 119 may be fed to the output ports 104a, 104b for further processing in an amplifier assembly external to such a network component (not shown in FIG. 1).

In accordance with an embodiment, the controller 108 and/or the power adjustment unit 116 are provided in the form of computer programs. In particular, a computer program for implementing the functions of the power adjustment unit 116 may be provided, the computer program being provided for processing a physical object, namely the power signal set 110, and being adapted for, when being executed by a data processor assembly, controlling one or more functions of the power adjustment unit 116 as described herein. The data processor assembly is generally indicated at 128 in FIG. 1.

Figure 2:
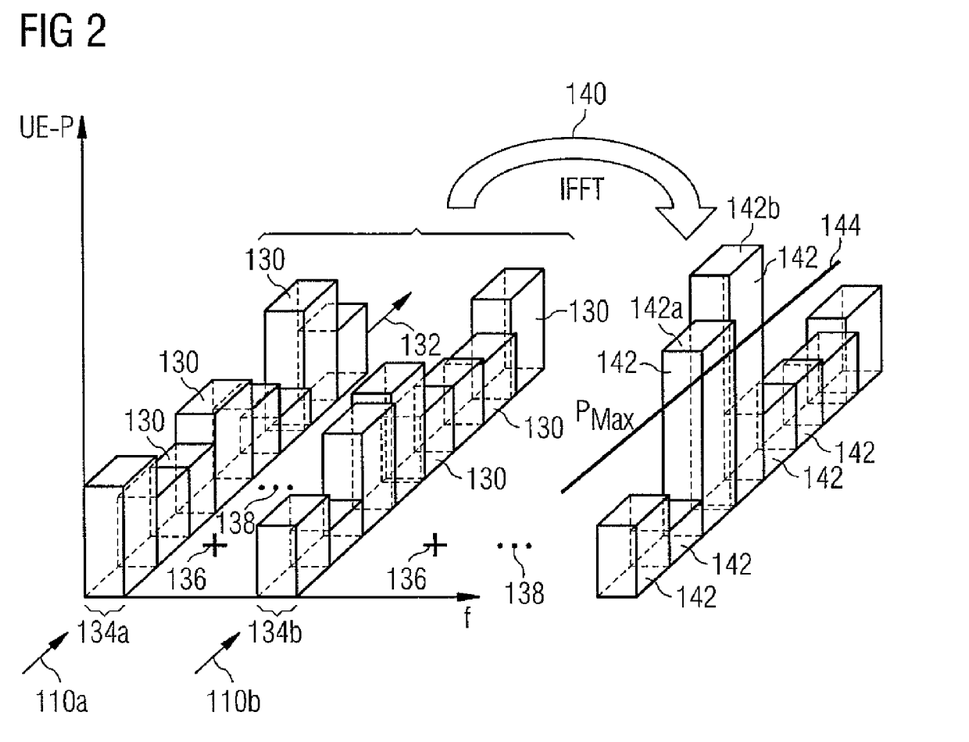
FIG. 2 shows details of a scaling procedure for scaling a power signal set in accordance with embodiments of the herein disclosed subject matter.

FIG. 2 shows details of a scaling procedure for scaling a power signal set in accordance with embodiments of the herein disclosed subject matter.

In particular, according to an embodiment shown in FIG. 2, the scaling of the power signal components of the power signal set is performed in a frequency domain.

FIG. 2 shows graphically power signal components in the form of beam forming weighting factors, some of which are indicated at 130, of two power signal sets 110a, 110b. The height of the boxes representing the beam forming weighting factors corresponds to the scheduled power to the receiving network component (e.g. scheduled UE power, UE-P). The beam forming weighting factors 130 of each power signal set 110a, 110b are arranged along a direction indicated with an arrow 132 in FIG. 2. Each power signal set 110a, 110b comprises eight (8) power signal components 130, corresponding to eight antennas. I.e. in contrast to FIG. 1 where only two antennas 106a, 106b are shown, the network component for which the power signal sets 110a, 110b of FIG. 2 are designed, comprises eight antennas. As shown in FIG. 2, each power signal set 110a, 110b has its own frequency subband 134a, 134b associated therewith. Hence the power signal sets 110a, 110b are located at different frequencies subbands along a frequency axis f. In accordance with an embodiment of the herein disclosed subject matter, each power signal component 130 specifies amplitude and phase for the corresponding transmission.

According to an embodiment, different frequency subbands 134a, 134b and its corresponding power signal sets 110a, 110b are associated with different user equipments.

In order to generate a time domain amplifier driver signal, the individual power signal components 130 corresponding to the same antenna are summed up, indicated by the "+" sign 136 in FIG. 2 and resulting in a sum component (not shown in FIG. 2). While only two power signal sets 110a, 110b are shown in FIG. 2, it should be understood that any other number of power signal sets may be provided by the controller (not shown in FIG. 2), depending on the number of UEs with which the network component (not shown in FIG. 2) actually communicates. Additional power signal sets which may possibly be present are indicated by the dots 138 in FIG. 2.

The sum component of each antenna is then subjected to an inverse-Fourier transformation, e.g. an inverse fast Fourier transformation (IFFT), indicated at 140 in FIG. 2, thereby yielding a Fourier transformed sum component for each antenna. Some of the Fourier transformed sum components are indicated at 142 in FIG. 2. The Fourier transformed sum component 142 may directly used as the amplifier driver signal 119 or, in another embodiment, may be further processed to yield the amplifier driver signal 119.

For illustration purposes, two of the Fourier transformed sum components 142, i.e. the components 142a, 142b in FIG. 2, are larger than the maximum available transmission power $P_{Max}$, indicated at 144. It should be mentioned, that in accordance with embodiments of the herein disclosed subject matter, the power adjustment unit is configured for scaling the power signal set so as to maintain the output power at each of the at least two output ports below the threshold 144. As a result, all Fourier transformed components 142 are maintained below the maximum available transmission power 144 (not shown in FIG. 2).

The fact that after IFFT the power provided by the power amplifier assembly for some antennas exceeds the available maximum transmission power, while the power for other antennas does not, represents a power imbalance. A further issue is an additional PAPR due to beamforming. Simulations have been carried out for an extreme case with single UE in each cell. Although single UE in each cell is not very popular, this can however help to reflect how serious the PAPR issue is, especially when number of beamforming UEs is limited and/or finite buffer traffic is supported.

In the following, a comprehensive category of potential solutions to the above mentioned problems are discussed. According to embodiments of the herein disclosed subject matter, the above issues are mitigated or solved by respective handling of the beamforming weighting vectors for each scheduled UE. This is possible because in contrast to non-beamforming systems (e.g. codebook-based precoding in TD-LTE and LTE FDD systems), in beamforming systems the power at different antenna for scheduled data to be transmitted to a UE is weighted by the respective beamforming weighting factor. The beamforming weighting factors for all antennas are referred to as beamforming weighting vector. For non-beamforming system, the weighting vector has uniform power at different antenna in frequency domain, so that after IFFT the power fluctuation in time domain and antenna domain is caused only by modulated data themselves, which is conventional PAPR issue. On the contrary in beamforming system, the scheduled UEs' data are scaled by beamforming weighting vector which has non-uniform power at different antenna before the IFFT. It is straightforwardly seen that this will usually impair the PAPR in time domain and power unbalance in antenna domain. Therefore, in accordance with embodiments this issue is solved or at least mitigated by controlling the weighting factor for the power of scheduled UEs UE by UE based on different criterions, some exemplary of which are discussed below. It is noted that these concepts are also applicable to weighting vectors having uniform power before IFFT. In other words, embodiments of the herein disclosed subject matter are also applicable to non-beamforming UEs.

Figure 3:
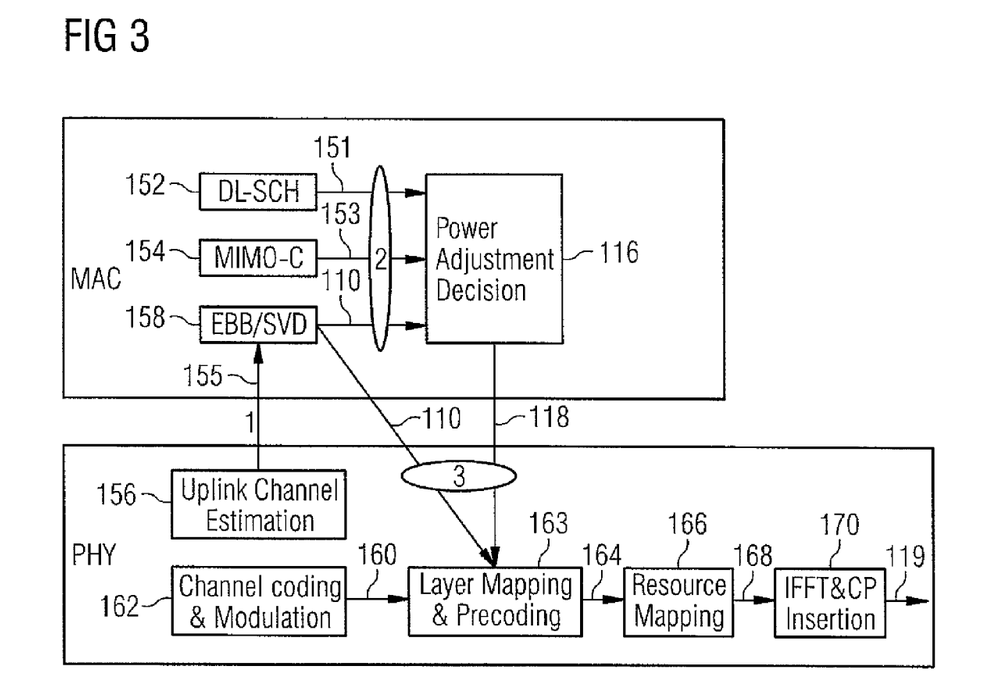
FIG. 3 shows a block diagram for signal processing in accordance with embodiments of the herein disclosed subject matter.

FIG. 3 shows a block diagram for signal processing in accordance with embodiments of the herein disclosed subject matter, including elements on a media access control layer (MAC) and on a physical layer (PHY). In particular, FIG. 3 shows the beamforming calculator part in the physical layer (PHY).

It should be understood that the layers shown in FIG. 3 may contain further elements. In particular, at least some radio resource manager (RRM) modules and inter-actions which are not influenced by embodiments of the herein disclosed subject matter are not shown in FIG. 3. In accordance with an embodiment, a new module is introduced in the RRM part, which is referred to as "power adjustment decision module" (PADM) 116 providing the functionality of embodiments of the power adjustment unit and the decision unit as described herein. This power adjustment decision module 116 can help to provide the information about how to scale the power for different scheduled UEs, i.e. based on what kinds of criterion to do this. This new module PADM 116 requires scheduling information 151 from a downlink scheduler 152 ("DL-SCH") and multiple-input-multiple-output (MIMO)-mode information 153 from a MIMO mode controller 154 ("MIMO-C") which indicate exactly the scheduled beamforming UEs out of all beamforming/non-beamforming UEs.

According to respective embodiments of the herein disclosed subject matter, processing is as follows:

1. The uplink channel state information 155 is obtained via uplink sounding (either instantaneous or long-term) from channel estimator 156. Taking advantage of channel reciprocity, such information 155 is input to a downlink EBB/SVD module (eigen-based beamforming/single value decomposition module) 158 which will calculate the weighting vector 110 for downlink beamforming UEs. The inputting of channel state information 155 to the EBB/SVD module 158 is indicated at 1 in FIG. 3.

2. A second group of information, indicated at 2 in FIG. 3, includes the scheduled beamforming UEs, indicated by scheduling information 151 and MIMO-mode information 153, together with corresponding beamforming weighting vectors 110. All such information is fed to the power adjustment decision module 116 which judges whether the power to the scheduled beam-forming UEs should be adjusted and furthermore how and/or to what extent the power is to be adjusted, if needed.

3. The third group of information, indicated at 3 in FIG. 3, is the final beamforming weighting vectors 110, 118 for PHY to apply to the data stream 160 provided by a channel coding and modulation module 162. The beamforming weighting vectors 110, 118 are utilized by PHY "precoding" module (layer mapping and precoding module 163) in a conventional manner. The resulting modified data stream 164 is then subjected to resource mapping in a resource mapping module 166. The thus resulting resource mapped data stream 168 is then subjected to inverse fast Fourier transformation (IFFT) and cyclic prefix insertion (cp insertion) in an IFFT&CP-insertion module 170, thus yielding the amplifier driver signal 119. It should be mentioned that in accordance with an embodiment the beamforming weighting vectors 110 of some UEs are not scaled. This is indicated at 110 in the third group of information (indicated at 3 in FIG. 3). In case that all beamforming weighting vectors are supplied to the PADM 116, no unscaled beamforming weighting vectors 110 would be supplied to the layer mapping and precoding module 163, in accordance with a further embodiment.

FIG. 3 shows an illustrative embodiment of the herein disclosed subject matter: The power adjustment is processed in frequency domain (before IFFT), so that it provides broad freedom for per-UE based adjustment.

Regarding to the criterions of how and/or to what extent the power of the transmissions from the antennas is adjusted, there are several options, some of which are exemplarily discussed in the following.

1. Geometry-based adjustment: In accordance with an embodiment, the power adjustment and decision unit 116 is configured for scaling the weighting vector 110 depending on the location of the receiving network component (see 112a, 112b, 112c in FIG. 1). For example, in an embodiment, there is set a UE-specific scale factor, calculated based on the UE geometry, e.g. based on the UE location. The UE geometry may be estimated by the base station or, in another embodiment, by the UE.

$$\alpha(UE_j) = \begin{cases} a_1 & \text{if } G(UE_j) < TH_1 \\ a_2 & \text{if } TH_1 \le G(UE_j) < TH_2 \\ \vdots & \vdots \\ a_{N-1} & \text{if } TH_{N-2} \le G(UE_j) < TH_{N-1} \\ a_N & \text{if } TH_{N-1} \le G(UE_j) \end{cases} \quad (1)$$

Herein, $G(UE_j)$ is the geometry of the UE or an indicator of the geometry of the UE. The set $\{TH_1, \ldots, TH_{N-1}\}$ are thresholds for different range of geometry distribution. The set $\{a_1, \ldots, a_N\}$ are the scale factors corresponding to different geometries defined by the thresholds.

Figure 4:
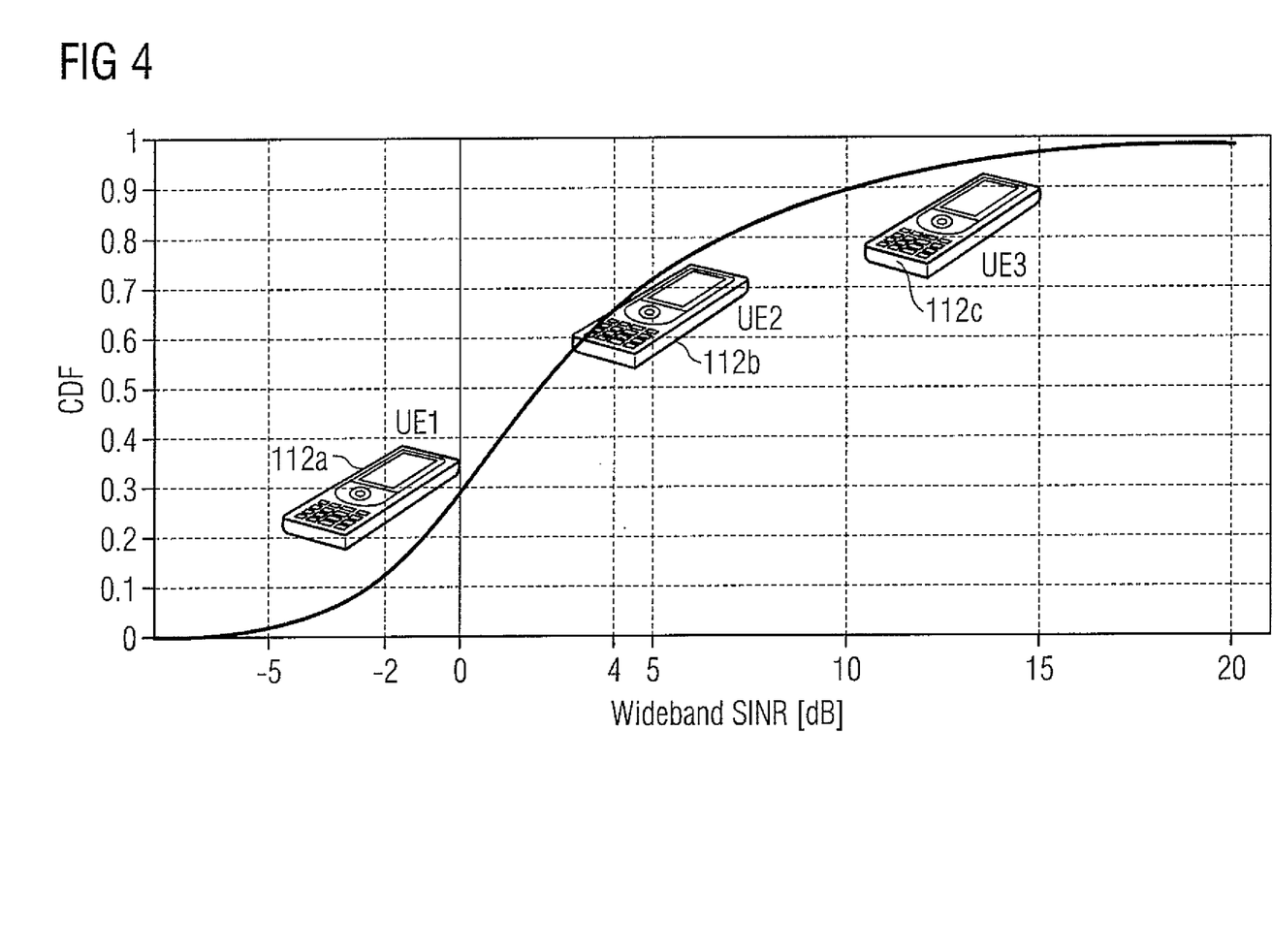
FIG. 4 shows a geometry cumulative distribution function (CDF) plotted over a wideband signal-to-noise-ratio (SINR), in accordance with embodiments of the herein disclosed subject matter.

A further example for this option is shown in FIG. 4 where the geometry cumulative distribution function (CDF) is plotted over the wideband signal-to-noise-ratio in decibel (dB).

For example, UE1 112a, UE2 112b and UE3 112c shown in FIG. 4 are scheduled in a current transmission time interval (TTI), and FIG. 4 shows the geometry CDF of current cellular and corresponding three UEs' geometry. Hence in an embodiment, the UE geometry is approximated by the wideband signal-to-noise ratio (SINR). Hence G(UE1)=−2 dB, G(UE2)=4 dB, G(UE3)=15 dB.

Assuming $$\alpha(UE_j) = \begin{cases} 0.9 & G(UE_j) < 0 \text{ dB} \\ 0.7 & 0 \text{ dB} \le G(UE_j) < 10 \text{ dB} \\ 0.5 & 10 \text{ dB} \le G(UE_j) \end{cases} \quad (2)$$

Then UE-specific scaling factor should be $\alpha(UE_1) = 0.9$;

$\alpha(UE_2) = 0.7$;

$\alpha(UE_3) = 0.5$;

In the exemplary embodiment, the UE with the highest SINR will be most downscaled. The relative more power reduction for high SINR UE will not harm the performance too much, compared with the cell edge UE. However, in other embodiments, any suitable criterion is possible when considering the geometry and the scaling resulting from this geometry. Then in this way, both the performance of cell throughput and coverage performance can be improved compared with fixed cell-specific scaling factor.

Another example extends such scaling method such that the base station can adjust the weighting factors of the weighting vector independently. The scale vector (which is hence not a single, skalar value) could be like:

$$\alpha(UE_j) = \begin{cases} [1.0\ 0.1\ 1.5\ 0.3\ 0.8\ 1.0\ 1.0\ 1.0] & G(UE_j) < 0\ \text{dB} \\ [2.0\ 1.1\ 1.5\ 0.3\ 0.3\ 1.0\ 3.0\ 1.0] & 0\ \text{dB} \le G(UE_j) < 10\ \text{dB} \\ [1.0\ 0.5\ 1.2\ 0.6\ 0.3\ 5.0\ 1.0\ 2.0] & 10\ \text{dB} \le G(UE_j) \end{cases}$$

Then UE-specific scaling vector should be $\alpha(UE_1)=[1.0\ 0.1\ 1.5\ 0.3\ 0.8\ 1.0\ 1.0\ 1.0]$;

$\alpha(UE_2)=[2.0\ 1.1\ 1.5\ 0.3\ 0.3\ 1.0\ 3.0\ 1.0]$;

$\alpha(UE_3)=[1.0\ 0.5\ 1.2\ 0.6\ 0.3\ 5.0\ 1.0\ 2.0]$;

Scaling the weighting factors of the weighting vector independently may even result in artificially discarding all the amplitude information of the beamforming weighting vector and keeping only the phase part. For example, in such an embodiment the scaling corresponds to setting the amplitudes of the beamforming weighting vector to specific values.

Generally herein, a scaling factor, e.g. the geometry scaling factor may be varied in a stepwise manner, e.g. similar to the embodiment of the geometry scaling factor in equations (1), (2), or may be varied according to a continuous function (not shown).

2. QoS/Traffic-Based Adjustment

In accordance with a further embodiment, the power adjustment decision module 116 is configured for scaling the beamforming weighting vector 110 depending on a transmission type of the transmission to the UE.

According to an embodiment, the QoS e.g. traffic type will be considered and used as the differentiating condition. For example, when different traffic types or different quality of service classes (specified e.g. by quality of service class identifiers (QCI)) coexist within the same system, then the radio resource manager (RRM) at base station (eNB) can decide to give different priorities to different QCI/traffic type UEs via different power adjustment factors, so that one additional dimension of radio resource management is obtained besides conventional scheduler.

Figure 5:
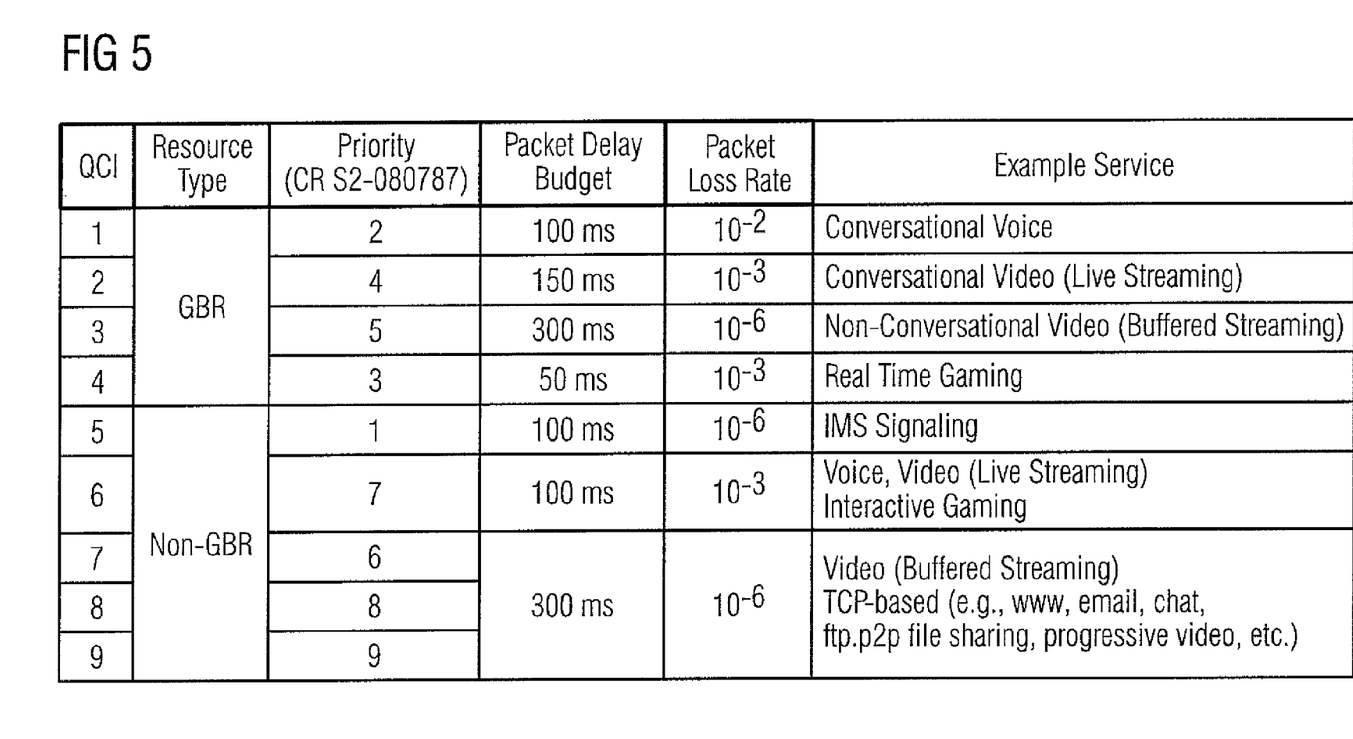
FIG. 5 shows a quality of service class identifier (QCI) classification in accordance with embodiments of the herein disclosed subject matter.

A QCI classification according to embodiments of the herein disclosed subject matter is shown in FIG. 5.

For example, when there are QCI2, QCI7 and CQI9 UEs in the same system, then according to an embodiment the QoS-based power adjustment is defined as follows:

$$\alpha(QCI) = \begin{cases} 1.0 & QCI = 2 \\ 0.9 & QCI = 7 \\ 0.5 & QCI = 9 \end{cases}$$

In this configuration, power of QCI2 UEs are kept unchanged so as to obtain the highest throughput; then CQI7 and CQI9 have different power down-scaling (or up-scaling) factor so that different priority.

According to another embodiment, the scaling is extended such that base station can adjust the weighting elements from the weighting vector independently. An exemplary scale vector (which is then not single value) is for example:

$$\alpha(UE_j) = \begin{cases} [1.0\ 0.1\ 1.5\ 0.3\ 0.8\ 1.0\ 1.0\ 1.0] & QCI = 2 \\ [2.0\ 1.1\ 1.5\ 0.3\ 0.3\ 1.0\ 3.0\ 1.0] & QCI = 7 \\ [1.0\ 0.5\ 1.2\ 0.6\ 0.3\ 5.0\ 1.0\ 2.0] & QCI = 9 \end{cases}$$

Then UE-specific scaling vector would be $\alpha(UE_1)=[1.0\ 0.1\ 1.5\ 0.3\ 0.8\ 1.0\ 1.0\ 1.0]$;

$\alpha(UE_2)=[2.0\ 1.1\ 1.5\ 0.3\ 0.3\ 1.0\ 3.0\ 1.0]$;

$\alpha(UE_3)=[1.0\ 0.5\ 1.2\ 0.6\ 0.3\ 5.0\ 1.0\ 2.0]$;

By employing embodiments of the herein disclosed subject matter, sampling reducing the power of all scheduled UEs, which will impact the coverage negatively because generally speaking the cell edge UEs are power-limited especially in relatively large cell, can be avoided.

According to a still further embodiment, each power signal component corresponding to a communication channel between the network component and the receiving network component, the power adjustment unit being configured for scaling the power signal set depending on a channel state of the communication channels corresponding to the power signal components of the power signal set.

According to an embodiment, where the scaling factor is determined by two or more criterions specified herein, the scaling factor may be determined by combining, e.g. multiplying, the individual scaling factors (e.g. geometry-based scaling factor and QoS-based scaling factor).

According to an embodiment, the scaling of the power signal set is done only under specific conditions, e.g. when the power amplifier is overloaded or is close to an overload condition. According to other embodiments, the scaling of the power signal set is generally applied and actual conditions are taken into account by respective scaling factors.

According to an embodiment, the scaling is applied only to a physical shared data channel together with corresponding dedicated resource. In particular at least in some embodiments, the scaling is not applied to common resources and control channels.

Having regard to the subject matter disclosed herein, it should be mentioned that generally a network component of a communication network may be configured to act as a transmitter as well as a receiver, although exemplarily the transmit function of a base station has been described in the detailed description section.

Further, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a network component as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the power adjustment unit or the controller are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein. According to an embodiment, the controller comprises a processor device including at least one processor for carrying out at least one computer program corresponding to a respective software module.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the herein disclosed subject matter one can state:

There is provided a network component of a wireless communication network. The network component comprises at least two output ports, each output port being associated with an antenna. The network component further comprises a controller for providing a power signal set having at least two power signal components, each power signal component being associated with one of at least two output ports and being indicative of a power portion to be provided to its associated antenna for generating a transmission to a receiving network component of the wireless communication network. Further, the network component comprises a power adjustment unit for scaling power signal components of the power signal set, thereby providing a scaled power signal set.

Embodiments of the herein disclosed subject matter may help to mitigate and solve the additional PAPR issue/power unbalance issue caused by beamforming in TD-LTE system, and may furthermore make the product requirement of TD-LTE to be comparable to that of FDD LTE, so that no additional cost will be needed for TD-LTE system. Also UE-specific adjustment provides one additional dimension for RRM with very slightly additional complexity. With some embodiments of the herein disclosed subject matter, fully solving the additional PAPR caused by beamforming via scaling or even artificially discarding all the amplitude information of the beamforming weighting vector and keeping only the phase part, which is just one extreme case of a scaling the components of the beamforming vector independently. Also geometry or/and QoS (QCI) can be used to select different power adjustment parameters for different UEs.

LIST OF REFERENCE SIGNS 100 wireless communication network
102 network component
104a, 104b output port
106a, 106b antenna
108 controller
110, 110a power signal set
110b further power signal set
112a receiving network component
112b, 112c further receiving network component
114a, 114b transmission
116 power adjustment unit
118 scaled power signal set
119 amplifier driver signal
120a, 120b transmission
122a, 122b transmission
123 inverse Fourier transformer
124 amplifier assembly
126a, 126b output power
128 data processor assembly
130 power signal component
132 direction of arrangement of power signal components of the same power signal set
134a, 134b frequency subband
136 + sign, indicating summation
138 dots indicating further power signal set(s)
140 inverse fast Fourier transformation (IFFT)
142 Fourier-transformed sum components
142a, 142b Fourier-transformed sum components exceeding the maximum available transmission power
144 maximum available transmission power ($P_{Max}$)
151 scheduling information
152 downlink scheduler
153 multiple-input-multiple-output (MIMO) mode information
154 MIMO mode controller
155 uplink channel state information
156 channel estimator
158 Eigen-based beamforming/single value decomposition module
160 data stream
162 channel coding and modulation module
163 layer mapping and precoding module
164 modified data stream
166 resource mapping module
168 resource mapped data stream
170 inverse fast Fourier transformation and cyclic prefix insertion module

The invention claimed is:

1. A transmitting device comprising:
at least two output ports, each output port being associated with an antenna;
at least one data processor configured with instructions stored on a computer-readable memory to provide a power signal set having at least two power signal components, each power signal component being associated with one of the at least two output ports and being indicative of a power portion to be provided to its associated antenna for generating a wireless transmission to a receiving device; and
a power adjustment unit for scaling the power signal components of the power signal set, thereby providing a scaled power signal set;
wherein each of the power signal components corresponds to a communication channel between the transmitting device and the receiving device, and
the power adjustment unit is configured to scale the power signal set depending on a channel state of the communication channels corresponding to the power signal components of the power signal set.

2. The transmitting device according to claim 1, wherein:
the at least one data processor is configured with the stored instructions to provide the power signal components of the power signal set in a frequency domain;
the power signal set being provided for a frequency subband associated with the receiving network component; and
the transmitting device further comprises an inverse-Fourier transformer configured to generate an amplifier driver signal in a time domain on the basis of the scaled power signal set.

3. The transmitting device according to claim 1, wherein each of the power signal components is a beam-forming weighting factor.

4. The transmitting device according to claim 3, wherein each of the beam-forming weighting factors are independent of one another and are selected based on at least one of location and quality of service requirements of the receiving device.

5. The transmitting device according to claim 1, wherein:
the at least one data processor is configured with the stored instructions to provide at least one further power signal set having at least two power signal components, each power signal component of the further power signal set being associated with one of the at least two output ports and being indicative of a power portion to be provided to its associated antenna for generating a respective transmission to a further receiving device; and
the power adjustment unit being configured for scaling the power signal set depending on the at least one further power signal set.

6. The transmitting device according to claim 1, further comprising
an amplifier assembly configured to generate at each of the at least two output ports an output power depending on the power signal component of the scaled power signal set;
wherein the power adjustment unit is configured to scale the power signal set so as to maintain the output power at each of the at least two output ports below a threshold.

7. The transmitting device according to claim 1, wherein the power adjustment unit is configured to scale the power signal set depending on at least one of: the location of the receiving device; and a transmission type of the transmission to the receiving device.

8. The transmitting device according to claim 1, wherein the power adjustment unit is configured to scale the power signal set per transmission time interval, the transmission time interval being the duration of an independently decodable transmission generated by the transmitting device.

9. The transmitting device according to claim 1, wherein the power adjustment unit operates to scale the power signal components of the power signal set by discarding all amplitude information of the power signal components and thereafter scaling using phase of the power signal components.

10. A method comprising:
receiving a power signal set having at least two power signal components, each power signal component being associated with one of at least two antennas of an access node of a wireless communication network, each power signal component being further indicative of a power portion to be provided to its associated antenna for generating a transmission-to a user equipment; and
scaling the power signal components of the power signal set, thereby providing a scaled power signal set;
wherein the power signal set is associated with a frequency subband and the frequency subband is associated with the user equipment communicating with the access node.

11. The method according to claim 10, wherein the scaling of the power signal components of the power signal set is performed in a frequency domain.

12. The method according to claim 10,
wherein the scaling of the power signal components of the power signal set is performed depending on an operating parameter of the access node and/or an operating parameter of the user equipment.

13. The method according to claim 10,
wherein each power signal component is a beamforming weighting factor determining the power level at the output port.

14. The method according to claim 13, wherein each of the beam-forming weighting factors are independent of one another and are selected based on at least one of location and quality of service requirements of the user equipment.

15. The method according to claim 10, wherein scaling the power signal components comprises discarding all amplitude information of the power signal components and thereafter scaling using phase of the power signal components.

16. A computer readable memory storing a computer program of instructions, which when executed by at least one data processor, cause a transmitting device to:
provide a power signal set having at least two power signal components, each power signal component being associated with one of at least two output ports of the transmitting device and being indicative of a power portion to be provided to a respective antenna of the transmitting device for generating a wireless transmission to a receiving device, each respective antenna associated with one of the output ports; and
scale the power signal components of the power signal set, thereby providing a scaled power signal set;
wherein each of the power signal components corresponds to a communication channel between the transmitting device and the receiving device, and
the power signal set is scaled in dependence on a channel state of the communication channels corresponding to the power signal components of the power signal set.

17. The computer readable memory according to claim 16, wherein the computer program of instructions, when executed by at least one data processor, further cause the transmitting device to:
generate at each of the at least two output ports an output power depending on the power signal component of the scaled power signal set;
wherein the power signal set is scaled so as to maintain the output power at each of the at least two output ports below a threshold.

18. The computer readable memory according to claim 16, wherein the power signal components of the power signal set are scaled by discarding all amplitude information of the power signal components and thereafter scaling using phase of the power signal components.

19. The computer readable memory according to claim 16, wherein each of the power signal components comprises a beam-forming weighting factor that are independent of one another, and are selected based on at least one of location and quality of service requirements of the receiving device.

20. A transmitting device comprising:
at least two output ports, each output port being associated with an antenna;
at least one data processor configured with instructions stored on a computer-readable memory to provide a power signal set having at least two power signal components, each power signal component being associated with one of the at least two output ports and being indicative of a power portion to be provided to its associated antenna for generating a wireless transmission to a receiving device;
a power adjustment unit configured to scale the power signal components of the power signal set so as to maintain output power at each of the at least two output ports below a threshold, thereby providing a scaled power signal set; and an amplifier assembly configured to generate the output power at each of the at least two output ports depending on the power signal component of the scaled power signal set.

21. The transmitting device according to claim 20, wherein the power signal components of the power signal set are scaled by discarding all amplitude information of the power signal components and thereafter scaling using phase of the power signal components.

22. The computer readable memory according to claim 20, wherein each of the power signal components comprises a beam-forming weighting factor that are independent of one another, and are selected based on at least one of location and quality of service requirements of the receiving device.

* * * * *